L. J. T. LAHRS.
CURTAIN FOR AUTOMOBILES.
APPLICATION FILED FEB. 21, 1912.
1,050,146.
Patented Jan. 14, 1913.
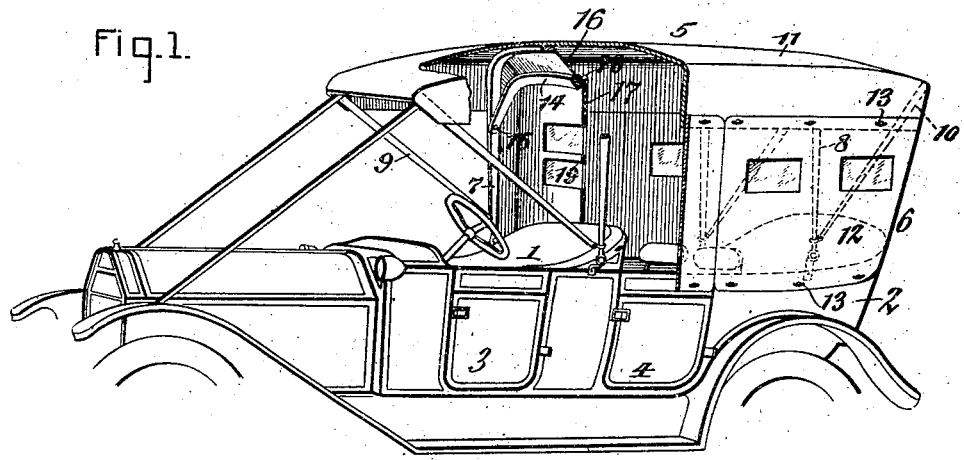
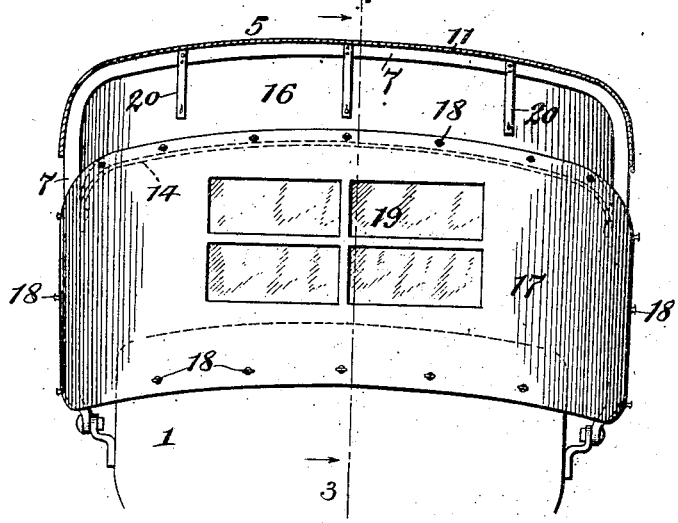
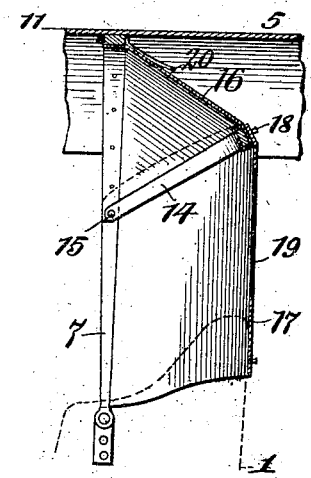
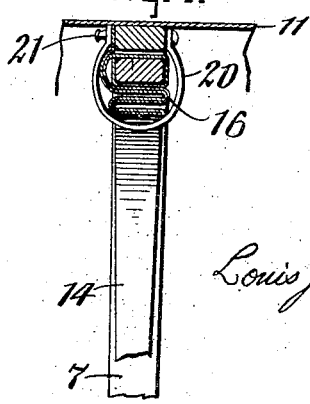
WITNESSES
M. Ray Taylor
Leroy S. Hodges
INVENTOR
Louis J. T. Lahrs
by Geyer & Popp
ATTORNEYS

UNITED STATES PATENT OFFICE.

LOUIS J. T. LAHRS, OF BUFFALO, NEW YORK.

CURTAIN FOR AUTOMOBILES.

1,050,146.   Specification of Letters Patent.   Patented Jan. 14, 1913.

Application filed February 21, 1912. Serial No. 679,046.

*To all whom it may concern:*

Be it known that I, LOUIS J. T. LAHRS, a citizen of the United States, residing at Buffalo, in the county of Erie and State of New York, have invented new and useful Improvements in Curtains for Automobiles, of which the following is a specification.

This invention relates to a movable partition or curtain which is designed to be placed within the inclosure of an automobile between the chauffeur's compartment and the passengers' compartment so as to permit of either placing the passengers' compartment directly in communication with the chauffeur's compartment during pleasant weather or to cut off communication between these compartments and forming a substantially tight closure on all sides of the passengers' compartment when this is desirable, for instance in cold, rainy or inclement weather.

It is the purpose of this invention to provide simple, efficient and convenient means whereby this separation of the chauffeur's and passengers' compartment may be quickly and easily effected, or the spaces of these two compartments may be thrown together so that there is free communication between the same, to suit the desire of the occupants.

In the accompanying drawings: Figure 1 is a fragmentary sectional perspective view showing an automobile equipped with a division curtain or partition between the chauffeur's and passengers' compartment in accordance with my invention. Fig. 2 is a fragmentary vertical transverse section of the body of the automobile taken in rear of the chauffeur's seat and looking forwardly. Fig. 3 is a vertical longitudinal section taken in line 3—3, Fig. 2. Fig. 4 is a fragmentary view similar to Fig. 3, but on an enlarged scale, and showing the division curtain or partition folded out of the way when it is not required for use.

Similar characters of reference indicate corresponding parts throughout the several views.

My invention is applicable to automobiles which vary widely in the details of their construction, that shown in the drawings as an example comprising a body having a front seat 1 which is usually occupied by the chauffeur, a rear seat 2 which is arranged in rear of the front seat and usually occupied by the passengers. Front and rear doors 3, 4 are provided for closing the passageways in the body leading to the front and rear seats, and a canopy extends over the front and rear seats and comprises a top 5, two side walls 6, 6 extending from the top downwardly to the body, and a rear wall extending from the rear end of the top to the rear seat and connecting the rear ends of the side walls in the usual and well known manner.

The canopy when constructed of the folding or removable type is usually made up of a frame work comprising front and rear main canopy bows or arches 7, 8 which are detachably connected at their lower ends with the sides of the front and rear seats, front and rear bow-shaped braces 9, 10 inclining forwardly and rearwardly from the front and rear main canopy bows, and a flexible covering extending over this frame work which covering may consist of canvas or other suitable material and comprises a top section 11 which is permanently secured to the upper parts of the main canopy bows, and side curtains or flaps 12 which are detachably secured at their upper and lower edges to the top covering and the body of the automobile by means of buttons 13 or other suitable fastenings.

In summer or pleasant weather, the space within the canopy in front of the front seat forming the chauffeur's compartment and the space between the front seat and the rear seat constituting the passengers' compartment communicate with each other.

In winter time or inclement weather it is desirable to cut off the chauffeur's compartment from the passengers' compartment so that the occupants of the latter will be protected from the weather and enjoy greater comfort while the chauffeur's compartment is more or less open or exposed to the outer atmosphere inasmuch as this is necessary to enable the chauffeur to obtain a better view of the roadway and drive the automobile safer. In order to permit of thus separating the chauffeur's from the passengers' compartment a removable division curtain or partition is provided which can be either extended across the space between these compartments or removed therefrom when desired. In its preferred form this division curtain or partition is constructed as follows:—14 represents a curtain or partition bow which is of substantially U-shaped form and provided with an upper cross bar and depending arms at opposite ends of the cross bar. These arms are pivoted at their lower ends to the inner sides of the upright arms of the front canopy bow, as shown at 15 in Figs. 1 and 3, said pivots being located at a distance from the upper cross bar of the front canopy bow equal to the length of the arms of the curtain bow so that the latter can be swung upwardly into an upright or folded position within the front canopy bow when desired. 16 represents the upper section of the division curtain or partition which is preferably constructed of canvas or similar flexible material and which is connected at its upper and lower edges with the roof of the canopy and the curtain bow. The upper edge of the upper curtain section is preferably connected with the cross bar of the front canopy bow which forms part of the roof of the latter. Although the upper curtain section may be detachably connected with the roof of the canopy and the curtain bow it is preferably permanently connected with these parts inasmuch as in the preferred embodiment of my invention it is not necessary to remove the curtain bow nor the upper curtain section from the automobile when the division curtain or partition is not required for use. When the division curtain or partition is in use the curtain bow is moved or swung downwardly and rearwardly on its pivots into a rearwardly and inclined position until the limit of this movement has been reached by the length of the upper curtain section which latter at this time is straightened or stretched and inclines from the upper part of the front canopy bow downwardly to the curtain bow, as shown in Figs. 1 and 3. The upper curtain section extends along the cross bars of the partition bow and the front canopy bow and also downwardly along the arms of the partition bow and the upper parts of the arms of the front canopy bow so that this upper curtain section while in its operative position is of substantially U-shaped form in a direction crosswise of the automobile, as shown. 17 represents a lower partition or curtain section which is also constructed of canvas or other flexible material and which is connected at its upper and lower edges to the partition bow and the back of the front seat while its opposite vertical or side edges are connected with the upright arms of the front canopy bow. The front canopy bow is mounted on the sides of the front seat some distance forward of the back of the same and the partition bow when swung rearwardly and downwardly into its operative position is arranged with its cross bar vertically in line or substantially so with the back of the seat. It follows from this arrangement of the parts that when the lower partition or curtain section is attached to the arms of the front canopy bow and also to the partition bow and the front seat that this lower curtain section will conform to the back and sides of the front seat and have a substantially U-shaped form crosswise of the automobile, as shown. The lower curtain section is preferably detachably connected with the front canopy bow, partition bow and front seat so as to permit of its removal and stowing away when not required for use. This detachable connection is preferably effected by means of buttons 18 arranged on the canopy bow, partition bow and front seat and engaging with suitable openings in the lower curtain section although any other suitable fastening may be employed if desired.

To permit the passengers to look forwardly through the partition the lower curtain section thereof is preferably provided with windows 19 of celluloid or panes of other suitable transparent material.

When the division curtain or partition is installed in an automobile in the manner described a practically tight compartment is provided for the passengers which is as comfortable as the permanently closed compartments heretofore known, with the added advantage that the compartment can be thrown open to the atmosphere when desired for the greater comfort or enjoyment of its occupants, as for instance in pleasant weather or summer time.

When the partition is not required the lower curtain section is removed and stowed away and the partition bow is swung upwardly and forwardly so that it is vertically in line with and within the front canopy bow, as shown in Fig. 4, and during this movement the upper curtain section is folded or doubled up. In order to hold the partition bow and the folded upper curtain section neatly in their inoperative position fastening means are provided which preferably comprise a plurality of fastening straps or bands 20 which pass downwardly around the folded part of the upper curtain section and the cross bar of the partition bow and each of which is preferably permanently connected at one end with the cross bar of the front canopy bow and detachably connected at its opposite end with this cross bar by means of a button 21, as shown in Fig. 4 or by any other suitable means.

The partition when in place within the automobile is neat in appearance and does not occupy any space which is used for other purposes. The same can be easily and quickly manipulated when the same is required for use or when the same is to be dispensed with and the same can also be produced without adding materially to the cost of the automobile.

I claim as my invention:

1. An automobile having a front seat, a rear seat, a canopy extending over said seats and having side walls and a top, and a movable curtain or partition adapted to separate the space in front of the front seat from the space in rear of the front seat comprising a bow pivoted at its ends to the side walls of the canopy, an upper curtain section connected at its upper and lower edges with the top of the canopy and said bow, and a lower curtain section connected at its upper and lower edges with said bow and front seat.

2. An automobile having a front seat, a rear seat, a canopy extending over said seats and having side walls and a top, and a movable curtain or partition adapted to separate the space in front of the front seat from the space in rear of the front seat comprising a bow pivoted at its ends to the side walls of the canopy, an upper curtain section connected at its upper and lower edges with the top of the canopy and said bow, and a lower curtain section connected at its upper and lower edges with said bow and front seat and at its side edges with the side walls of the canopy.

3. An automobile having a front seat, a rear seat, a canopy extending over said seats and having side walls and a top, and a movable curtain or partition adapted to separate the space in front of the front seat from the space in rear of the front seat comprising a bow arranged below the top of the canopy and between the side walls thereof and having its arms depending and pivoted to said side walls so as to be capable of being turned upwardly into an upright inoperative position or into a rearwardly inclined operative position, an upper curtain section connected with said bow and the top of the canopy and adapted to be either folded when the bow is in its inoperative position or straightened into a rearwardly inclined position when the bow is in its operative position, and a lower curtain section connected at its upper and lower edges with said bow and said front seat and at its side edges with the side walls of the canopy.

4. An automobile having a front seat, a rear seat, a canopy extending over said seats and having side walls and a top, and a movable curtain or partition adapted to separate the space in front of the front seat from the space in rear of the front seat comprising a bow arranged below the top of the canopy and between the side walls thereof and having its arms depending and pivoted to said side walls so as to be capable of being turned upwardly into an upright inoperative position or into a rearwardly inclined operative position, an upper curtain section permanently connected with said bow and the top of the canopy and adapted to be either folded when the bow is in its inoperative position or straightened into a rearwardly inclined position when the bow is in its operative position, and a lower curtain section detachably connected at its upper and lower edges with said bow and said front seat and at its side edges with the side walls of the canopy.

5. An automobile having a front seat, a rear seat, a canopy extending over said seats and having side walls and a top, and a movable curtain or partition adapted to separate the space in front of the front seat from the space in rear of the front seat comprising a bow arranged below the top of the canopy and between the side walls thereof and having its arms depending and pivoted to said side walls so as to be capable of being turned upwardly into an upright inoperative position or into a rearwardly inclined operative position, an upper curtain section permanently connected with said bow and the top of the canopy and adapted to be either folded when the bow is in its inoperative position or straightened into a rearwardly inclined position when the bow is in its operative position, a lower curtain section detachably connected at its upper and lower edges with said bow and said front seat and at its side edges with the side walls of the canopy and fastenings for holding the bow and upper curtain section in a folded position against the top of said canopy.

6. An automobile having a front seat, a rear seat, a canopy extending over said seats and having side walls and a top, and a movable curtain or partition adapted to separate the space in front of the front seat from the space in rear of the front seat comprising a bow arranged below the top of the canopy and between the side walls thereof and having its arms depending and pivoted to said side walls so as to be capable of being turned upwardly into an upright inoperative position or into a rearwardly inclined operative position, an upper curtain section permanently connected with said bow and the top of the canopy and adapted to be either folded when the bow is in its inoperative position or straightened into a rearwardly inclined position when the bow is in its operative position, a lower curtain section detachably connected at its upper and lower edges with said bow and said front seat and at its side edges with the side walls of the canopy, and fastenings for holding the bow and upper curtain section in a folded position against the top of said canopy comprising straps adapted to be passed downwardly around the bow and the upper curtain section in the folded position of these parts and connected at their ends to the top of the canopy.

Witness my hand this 15th day of February, 1912.

LOUIS J. T. LAHRS.

Witnesses:
THEO. L. POPP,
ANNA HEIGIS.